D. E. McSHERRY.
Wheat Drill.
No. 84,895.  Patented Dec. 15, 1868.
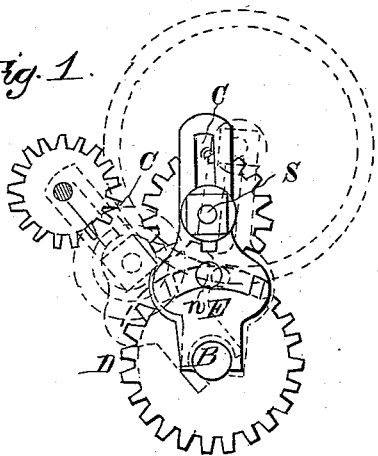
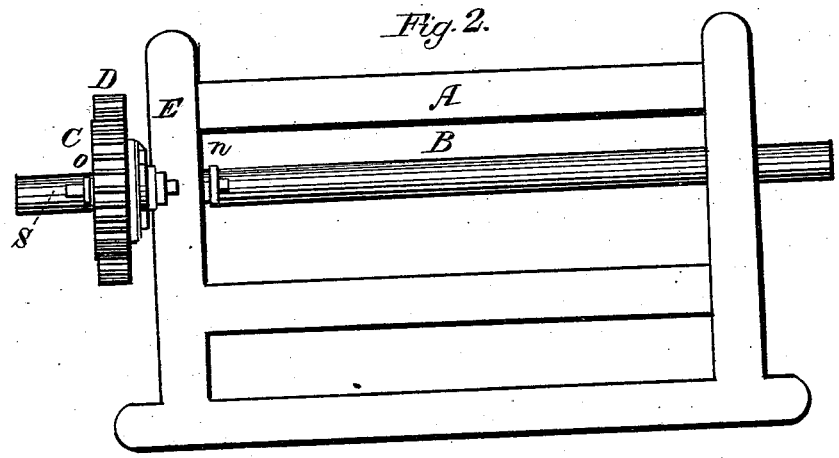
Witnesses:
B. Pickering
E. D. Kiefer
Inventor:
Daniel E. McSherry

DANIEL E. McSHERRY, OF DAYTON, OHIO.

Letters Patent No. 84,895, dated December 15, 1868.

IMPROVEMENT IN WHEAT-DRILL.

The Schedule referred to in these Letters Patent and making part of the same.

*To all whom it may concern:*

Be it known that I, DANIEL E. MCSHERRY, of Dayton, in the county of Montgomery, in the State of Ohio, have invented a new and useful Improvement in Wheat-Drills; and I do hereby declare that the following is a full and exact description thereof, reference being had to the accompanying drawings, and to the letters of reference marked thereon.

Like letters, occurring on the different figures, refer to like parts.

The nature of my invention consists in an adjustable arm, by which varying gears may be used.

Figure 1 represents a side view of the arm and gear.

Figure 2 represents a top view of the gear, and its relation to the shaft and frame of a wheat-drill.

A represents the frame, to the under side of which is attached the shaft B, by suitable boxing. This is the driving-shaft to which the wheels are attached; and external to the frame the cog-wheel D is attached to the shaft; and between this wheel and the frame is an adjustable arm, E. (See fig. 1.) This arm has a curved slot, representing a segment of a circle, for the bolt $n$, which passes through a hole in the frame, the head of which rests against the sides of the slot. On the opposite end the nut is used to draw the arm firmly against the frame to stay it in position. The lower end of the arm is forked to fit over the axle, and may be fitted to fit on a projecting part of the boxing, as indicated by dotted lines at B, fig. 1.

The arm is also slotted longitudinally for the bolt $s$, which forms an adjustable axle for the wheel C, which axle is fastened by a nut.

The pin $o$ is used to stay the wheel on its axle.

The wheel C forms an intermediate gear, and spur-wheels of varying sizes may be used by the adoption of this adjustable arm, and thus a varying speed may be secured to the distributing or seeding apparatus.

The straight dotted lines, fig. 1, represent the frame, whilst the figure represents the side of the arm and gear next to the frame.

What I claim as my invention, and desire to secure by Letters Patent, is—

The adjustable arm E, and its arrangement with reference to the shaft B, the frame A, the spur-wheels C and D, bolt $n$, and axle $s$, substantially as described and for the purpose specified.

DANIEL E. McSHERRY.

Witnesses:
   B. PICKERING,
   E. D. KIEFER.